UNITED STATES PATENT OFFICE.

JOHN FLEMING WHITE, OF BUFFALO, NEW YORK.

PROCESS OF MAKING NITRIC ACID.

SPECIFICATION forming part of Letters Patent No. 648,322, dated April 24, 1900.

Application filed February 23, 1899. Renewed October 9, 1899. Serial No. 733,100. (No specimens.)

*To all whom it may concern:*

Be it known that I, JOHN FLEMING WHITE, a citizen of the United States, residing at Buffalo, in the county of Erie and State of New York, have invented new and useful Improvements in the Manufacture of Nitric Acid, of which the following is a specification.

This invention has for its object to prevent the production of large quantities of weak nitric acid in the manufacture of nitric acid from concentrated sulphuric acid and sodium nitrate, ($NaNO_3$.)

In manufacturing nitric acid by the usual method the sodium nitrate and sulphuric acid are placed in a retort, the nitric acid is distilled off by the application of heat and collected by condensation, and the residue remaining in the retort is drawn off and forms the so-called "nitre cake," which is composed of about fifty parts of sodium sulphate, thirty-three parts of sulphuric acid, and seventeen parts of water and insoluble matter. The greater part of the nitric acid so produced is strong acid containing not less than ninety-six per cent. of nitric acid ($HNO_3$) and four per cent. of water. This is the strength required when the nitric acid is to be used in the manufacture of nitro compounds—such as nitroglycerin, nitrocellulose, (guncotton,) &c.—when good yields and a stable nitro compound are required. The smaller part of the acid so produced is weak acid containing about seventy-four per cent. of nitric acid and twenty-six per cent. of water. This weak acid has a very limited use and accumulates in large quantities and many devices and methods have been produced to concentrate the same, either in the condenser or afterward; but these devices and methods are all more or less complicated and expensive.

My invention has the purpose to provide a cheap and simple method whereby the production of weak acid in large quantities is avoided.

In practicing this invention the retort is charged in the ordinary manner with sodium nitrate and concentrated sulphuric acid—for illustration, sixteen hundred pounds of sodium nitrate and two thousand pounds of concentrated sulphuric acid. The charge is then distilled off by the application of heat in the usual way and produces about eight hundred and fifty pounds of strong acid of ninety-six per cent. and about two hundred and ten pounds of weak acid of about seventy-four per cent. This weak acid is separately collected, as usual. In the next charge of the retort this weak acid is added to the charge of sodium nitrate and concentrated sulphuric acid in any convenient way. I prefer to add the weak nitric acid to the concentrated sulphuric acid and to run the mixture into the retort in the usual way. The charge is now distilled off in the usual manner and produces about ten hundred and eleven pounds of strong nitric acid of ninety-six per cent., or one hundred and sixty-one pounds more than the first charge, and, as in the first charge, two hundred and ten pounds of weak acid of seventy-four per cent. This weak acid is again added to the next charge, which produces the same yield of strong and weak acid as the second charge. In this manner the weak acid produced by one charge is utilized in the next following charge, and at the end of the operation, no matter how long continued from day to day, there is no more weak acid on hand than there is produced by one charge, while if the ordinary treatment is followed each charge produces that quantity of weak acid, and these quantities accumulate and are to a large extent unsalable, as there is but little demand for this weak acid.

The reason why the weak acid is converted into strong acid by adding it to the charge is, apparently, that the excess of water combines with the nitre cake which is formed in the retort. This additional percentage of water in the nitre cake has the further advantage that it lowers the melting-point of the nitre cake and so permits the distillation to be carried on at a lower temperature, thereby avoiding loss of nitric acid by the decomposition resulting from excessive heat. It is therefore found in practice that this method not only renders the formation of weak acid insignificant, but also increases the general yield of strong acid beyond that which is due to the conversion of weak acid into strong acid—in the case stated beyond the increase due to the conversion of two hundred and ten pounds of weak acid into one hundred and sixty-one pounds of concentrated acid. These results are produced in my method without any additional expense and without any change in the apparatus.

I claim as my invention—

The herein-described method of converting weak nitric acid into strong nitric acid in the process of manufacturing nitric acid from sodium nitrate and sulphuric acid, which method consists in adding the weak nitric acid to the charge of sodium nitrate and sulphuric acid and distilling the charge, substantially as set forth.

Witness my hand this 22d day of February, 1899.

JOHN FLEMING WHITE.

Witnesses:
 EDWARD WILHELM,
 ELLA R. DEAN.